Dec. 8, 1925.　　　　　　　　　　　　　　　　　　　　1,564,722
O. D. TAUERN ET AL
APPARATUS FOR INSPECTING FILM BANDS
Filed July 16, 1924　　　2 Sheets-Sheet 1

Inventors
Odo D. Tauern
Fritz Jenne
by
Attorney

Dec. 8, 1925.                                                 1,564,722
O. D. TAUERN ET AL
APPARATUS FOR INSPECTING FILM BANDS
Filed July 16, 1924          2 Sheets-Sheet 2

Inventors
Odo D. Tauern
Fritz Jenne
by
Attorney

Patented Dec. 8, 1925.

1,564,722

UNITED STATES PATENT OFFICE.

OLO D. TAUERN AND FRITZ JENNE, OF FREIBURG, GERMANY, ASSIGNORS TO APPARATEBAU FREIBURG G. M. B. H., OF FREIBURG, GERMANY.

APPARATUS FOR INSPECTING FILM BANDS.

Application filed July 16, 1924. Serial No. 726,333.

*To all whom it may concern:*

Be it known that we, ODO D. TAUERN and FRITZ JENNE, both citizens of Germany, and both residing at Freiburg, Germany, have invented certain new and useful Improvements in Apparatus for Inspecting Film Bands, of which the following is a specification.

The present invention has reference to an apparatus for testing moving-picture films, and relates more specifically to an apparatus for directly inspecting a continuous film band for faults without projecting it onto a screen.

The apparatus essentially consists of a film guiding drum and a take-up drum and interposed mechanism, including a source of light and shutter, to which is added a mirror or prism for redirecting the image rays to make them appear in a horizontal plane and a single, relatively large viewing lens to moderately enlarge the picture for direct inspection with both eyes. The apparatus is conveniently arranged on a suitable support at table height, so that the tester can sit down to it and unwind the film band by hand or motor and view the picture in the large lens in the correct position without eye strain. Any corrections or changes in the film can readily be made by taking out the faulty film section and treating it, as the case may require, on the splicing and other correcting attachments well known in the art and placed close to our improved testing apparatus, whereupon the corrected film is reintroduced into the latter and further unreeled for inspection. This simple, inexpensive apparatus successfully replaces the ordinary large projecting apparatus and screen and will prove of great value not only to the film manufacturer and his tester, but also to the film distributor, dealer, renter and buyer, as a film can at all times without any preparation be run through for inspection with several persons viewing the picture.

Figure 1:
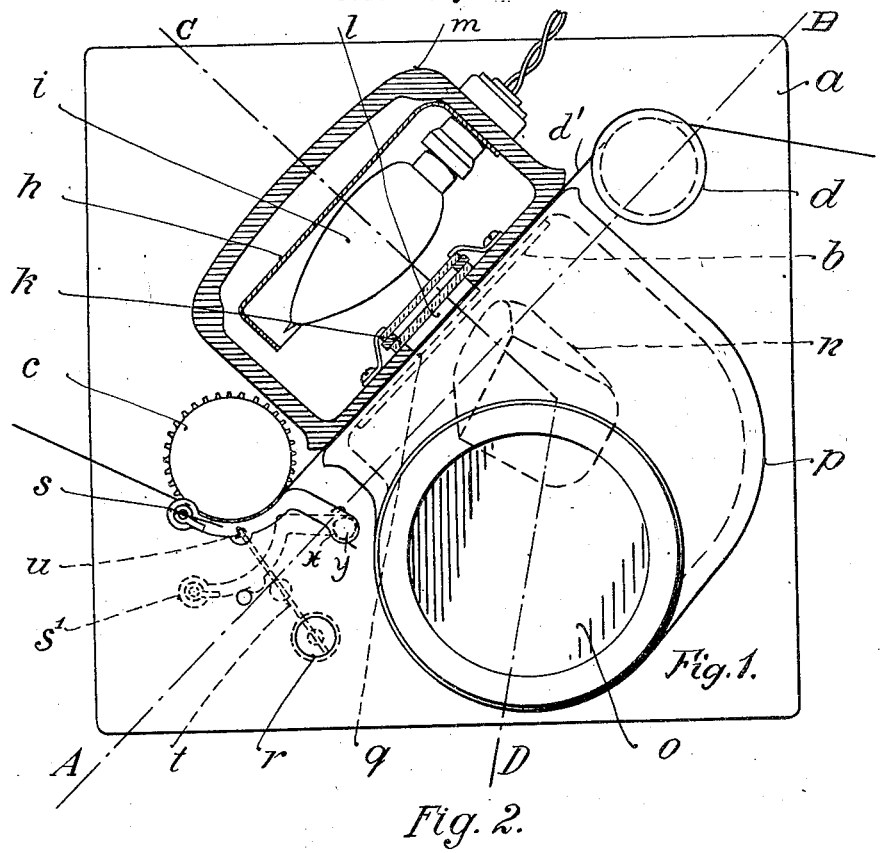
Figure 2:
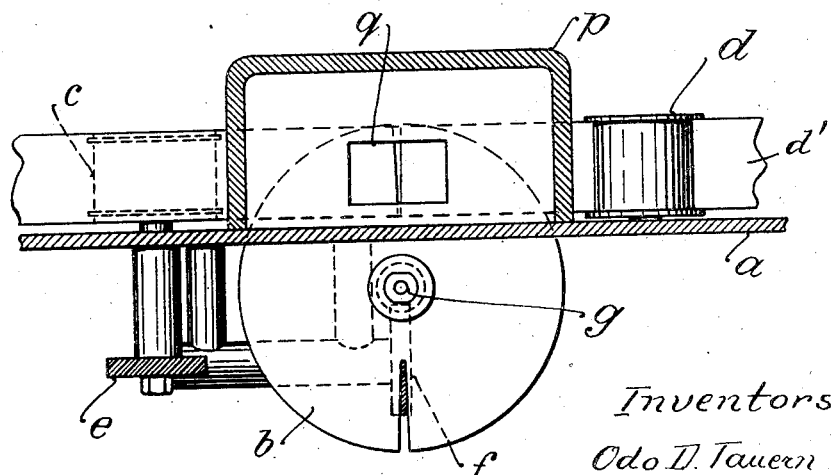
Figure 3:
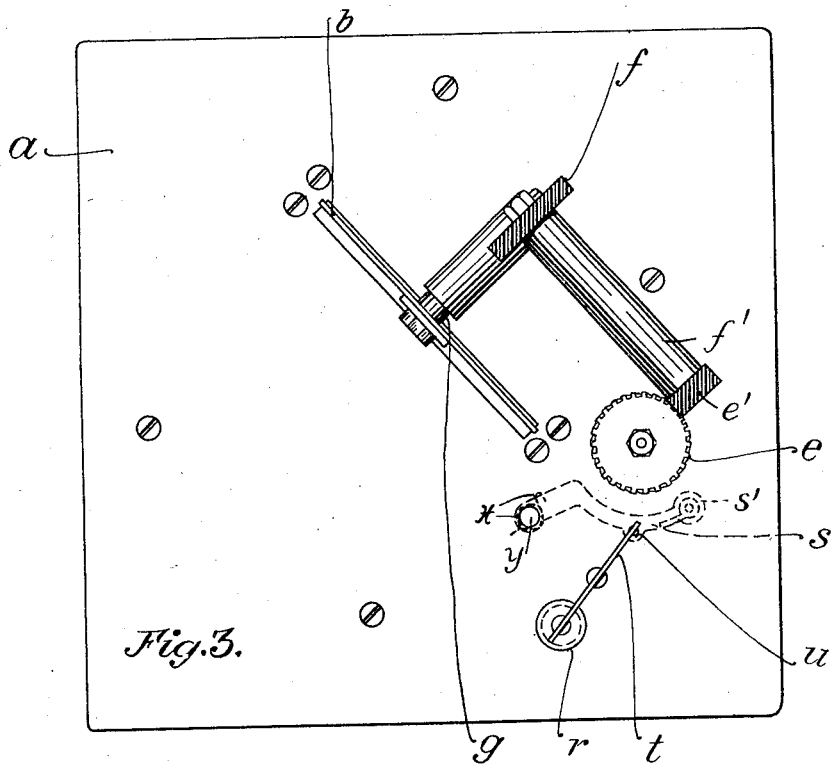
Figure 4:
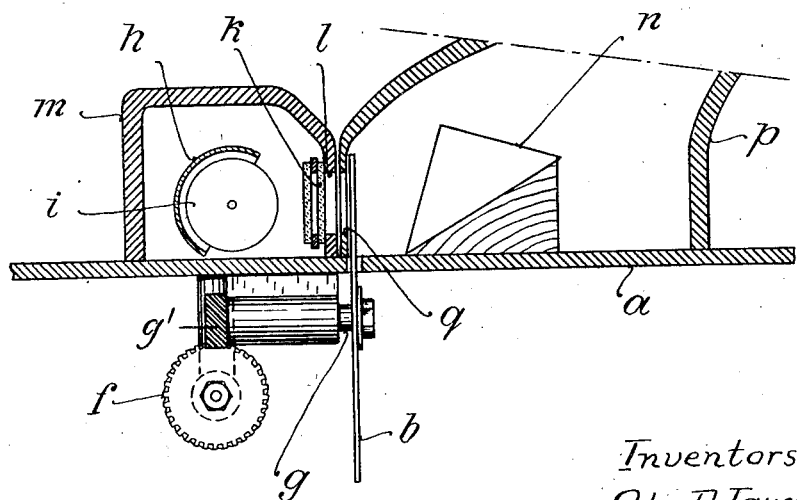

In order to make our invention readily understood we will now describe it in detail in connection with the accompanying drawings, in which Fig. 1 is a plan view, with the top of the lamp house removed; Fig. 2 is a section on line A—B of Fig. 1; Fig. 3 is a bottom view of the base plate with the driving gear for the disc shutter, and Fig. 4 is a vertical section on line C—D of Fig. 1.

On the base plate $a$ are rotatably mounted the film guide drum $d$ and the take-up drum $c$, the latter being provided with circumferential sprocket teeth $c'$ for engagement in the edge perforations of the film band $d'$. A worm gear $e$ fixed to the take-up drum, which latter may be rotated by hand or power, meshes with a worm $e'$ on the rotary shaft $f'$ to the other end of which is fixed the worm wheel $f$, which meshes with a worm $g'$ fixed on the shutter shaft $g$. The shutter $b$ is of the ordinary slotted rotary disc type, and by rotating the take-up drum the shutter is revolved in front of the film gate $l$. Back of the film gate is mounted the lamp house $m$ with bulb $i$ and reflector $h$. Between the source of light and the light aperture $l$ is arranged a ground glass plate $k$. In front of the lamp house $m$ is mounted a housing $p$, close to the lamp house front, with just enough clearance to allow of the film band freely passing between past the registering light apertures $l$ and $q$, the shutter preferably operating in the front housing $p$. In the latter is mounted the mirror or prism $n$, designed for redirecting the image rays through an angle of 90 degrees. In the front end of the housing $p$ is mounted a relatively large lens $o$, in which the image appears moderately enlarged and right side up, substantially rectangularly to the vision axis of the operator.

To safeguard the cooperation of take-up drum and film band, there is provided an idler device, comprising a curved arm $s$, mounted for rocking movement at $y$, and carrying at its free end a roller $s'$, the latter normally unrolling on the film as it is taken up and thereby ensuring the engagement of the sprocket teeth in the edge perforations of the film band. A coiled spring $x$ tends to force the arm into the inoperative position shown in dotted outline in Fig. 1. A rock lever $t$, provided at the front end with a pin $u$, and at the rear with a finger plate $r$, normally retains the idler arm $s$ in operative position (full outline in Fig. 1). By depressing the plate $r$ the lever $t$ is rocked and the pin $u$ frees the swing arms $s$, so that now, under the urge of its spring $x$, it moves into the dotted line position out of contact with the drum.

The advantages of the described mechanism are obvious. No special drive is necessary, as the crank-turning of the take-up drum properly operates the shutter as well. The film band is unreeled evenly without being subjected to the jerky feed movements which the film undergoes in the ordinary projecting machine, and thus the life of the film perforations is greatly prolonged. The image appears exactly as in the case of the ordinary projector, so that the continuity of the action is assured. By the use of a mirror, or as shown a prism $n$, the image rays are redirected to appear in a horizontal plane and can thus be viewed in comfort by the seated tester. By using a relatively large viewing lens a pleasing satisfactory enlargement is obtained and both eyes can be used without undue strain. The film band can readily be inserted into the mechanism, or removed therefrom for cutting, splicing or other purposes.

What we claim is:—

1. In an apparatus of the character set forth, in combination with a source of light, a film gate illumined by said source of light, means for traveling a film band past said gate, an enlarging viewing lens extending in a plane substantially at right angles to said film gate, and ray-deflecting means interposed between said gate and said lens for redirecting the image rays onto said viewing lens.

2. In an apparatus of the character set forth, in combination, a base plate, a lamp house including a source of light, a reflector and a light aperture or film gate, a housing presenting an aperture in register with said film gate, and a relatively large viewing lens at the further end of said housing, ray deflecting means in this housing for redirecting the light rays passing through said registering apertures onto said viewing lens, means for traveling an edge-perforated film band through between said lamp house and said lens housing past said registering light apertures, a rotary apertured shutter operating between said source of light and said ray redirecting means, and means for positively interconnecting said film traveling means and said shutter for operating the latter in timed relation to the feed of the film by the operation of the former.

3. In an apparatus of the character set forth, in combination, a source of light, a film gate, a shutter controlling said film gate, means for traveling a film band past said film gate comprising a guiding drum and a take-up drum, and a train of gears interposed between said take-up drum and said shutter for positively operating the latter in timed relation to the rotary speed of said take-up drum, means associated with said take-up drum for insuring a good purchase of the latter on the film band, comprising a swing arm with roller head and means tending to urge this arm into the inoperative position away from said drum, a trip member normally retaining said swing arm in its operative position but allowing it, on release, to move into the inoperative position.

ODO D. TAUERN.
FRITZ JENNE.